United States Patent [19]

Wada et al.

[11] Patent Number: 4,673,493

[45] Date of Patent: Jun. 16, 1987

[54] APPARATUS FOR SUPPLYING FILTERED LIQUID

[75] Inventors: Atsuki Wada, Uji; Mikio Takahashi, Suita; Eiji Suhara, Neyagawa, all of Japan

[73] Assignee: Kurashiki Boseki Kabushiki Kaisha, Kurashiki, Japan

[21] Appl. No.: 715,347

[22] Filed: Mar. 25, 1985

[51] Int. Cl.⁴ .............................................. B01D 21/30
[52] U.S. Cl. ..................................... 210/98; 210/102; 210/104; 210/109; 210/134; 210/141
[58] Field of Search ................... 210/97, 98, 100, 103, 210/109, 102, 104, 105, 110, 111, 112, 114, 115, 116, 130, 134, 141, 142

[56] References Cited

FOREIGN PATENT DOCUMENTS 24166 4/1983 Japan .

Primary Examiner—Frank Sever

[57] ABSTRACT

The present invention relates to an apparatus of a fixed type for supplying filtered liquid which is able to filter liquid containing impurities of minute solid particles and then supply the filtered liquid while further filtering the same, said apparatus itself being of a fixed type, so designed that the liquid is repeatedly passed through a filter member provided within said apparatus for sufficient filtration, and at the same time, the liquid is filled in a movable container with rollers so as to be freely taken in or out of the apparatus in a completely purified condition, wherein the liquid in the movable container is transferred to fixed tanks, when the movable container is separated from the apparatus so as to be filled with fresh liquid, further to a discharge port through said filter member.

9 Claims, 7 Drawing Figures

APPARATUS FOR SUPPLYING FILTERED LIQUID

DETAILED DESCRIPTION OF THE INVENTION

1. Field of the Invention

The present invention relates to an apparatus for supplying filtered liquid and more particularly, to an apparatus for supplying filtered liquid of a fixed type which is able to filter liquid containing impurities of minute solid particles, and supply the filtered liquid at a desired time while further filtering the same.

In recent years, medicinal, food and electronic industries have paid greatly important attention to the aforementioned supply of filtered liquid. Particularly, in the field where high purities are required, for example, in the field of manufacturing printed circuits or electronic circuits such as precise ICs and the like in the electronic industry, when minute solid particles are mixed in liquid to be used, it becomes difficult to manufacture products in precise accordance with the design, giving rise to frequent generation of inferior products. These minute particles have possibilities to be mixed in the liquid at the time of transportation of the liquid or during the time of storage thereof even though the particles are removed from the liquid at the time of manufacturing and refining of the same, and accordingly, it is highly desired to remove the impurities through filtration of the liquid immediately before use. Thus, it is essential for the apparatus of this kind to filter the liquid sufficiently and at the same time, transfer the liquid with ease while maintaining the liquid in a clean and purified state.

2. Description of the Prior Art

With respect to the supplying apparatus of the above-described type, there has been proposed such an apparatus, in order to supply the liquid in the dust-free state, that is designed to supply the liquid through pipes to a device using the liquid. However, such an apparatus as this is disadvantageous in that it cost much for arrangement of the pipes, and at the same time it is not certain from the viewpoint of safety. On the other hand, there has been proposed in the published specification of Japanese Patent Publication Tokkaisho No. 58-24166 (24166/1983) an apparatus for supplying filtered liquid of a moving type which is able to be moved to a desired place in a factory. However, it is troublesome to move the whole apparatus. In addition, the filtering means themselves are inevitably of simple construction because the apparatus should be compact in size and light in weight, thus no satisfactory filtering efffects being expected. At the same time, when a container or a tank for the liquid becomes empty, the filtering operation is interrupted in order to replace the container or the tank with fresh one, and therefore, the prior art supplying apparatus is disadvantageous in that it cannot be used without interruption of the filtering operation.

OBJECT OF THE INVENTION

Accordingly, an essential object of the present invention is to provide an improved apparatus for supplying filtered liquid of a fixed type wherein it is so arranged that the liquid is repeatedly passed through a filter member within the apparatus for sufficient filtration, which liquid is filled in a movable container provided with rollers so as to be freely taken in or out of the apparatus, thereby effecting purification of the liquid at the time of taking-in thereof to the apparatus, said apparatus being further arranged so that the liquid within the movable container in the apparatus is transferred to fixed tanks, from which the liquid is further transferred through the filter member to a discharge port, said movable container being able to be separated from the apparatus after the transfer of the liquid to the fixed tank such that the movable container can be filled with fresh liquid without interrupting the filtering operation.

CONSTRUCTION OF THE INVENTION

In accomplishing these and other objects of the present invention, there is provided an improved apparatus for supplying filtered liquid which comprises a supply port for supplying pressed air and a discharge port for discharging liquid, both formed in a main housing fixed to the apparatus, a movable container filled with the liquid detachably accommodated within the main housing, a first tank into which the liquid is transferred from the movable container and a second tank into which the liquid is transferred from said first tank and vice versa, both first and second tanks being fixedly accommodated within the main housing, wherein there are further provided air pipes respectively communicating from said air supply port to said movable container, to said first tank and to said second tank, and each formed with a switching valve, while there are further provided liquid passages respectively communicating between said movable container and said first tank, between said first tank and said second tank and between said liquid discharge port and a middle portion to be disposed between said first tank and said second tank, and each formed with a switching valve, said liquid passage between the first and second tanks being provided with a filter member, so arranged that, through control of the switching valves for circulation of the liquid between the first and second tanks through the filter member, the liquid after having been transferred from the movable container to the first tank by the action of air is repeatedly circulated between the first and second tanks through the filter member to be discharged out of the liquid discharge port.

DESCRIPTION OF THE PREFERRED EMBODIMENT

The present invention will be apparaent from the following description taken in conjunction with one preferred embodiment thereof with reference to the accompanying drawings.

BRIEF DESCRIPTION OF THE DRAWINGS

FIG. 5 (a), (b) and (c) are a flowchart of the apparatus.

Figure 1:
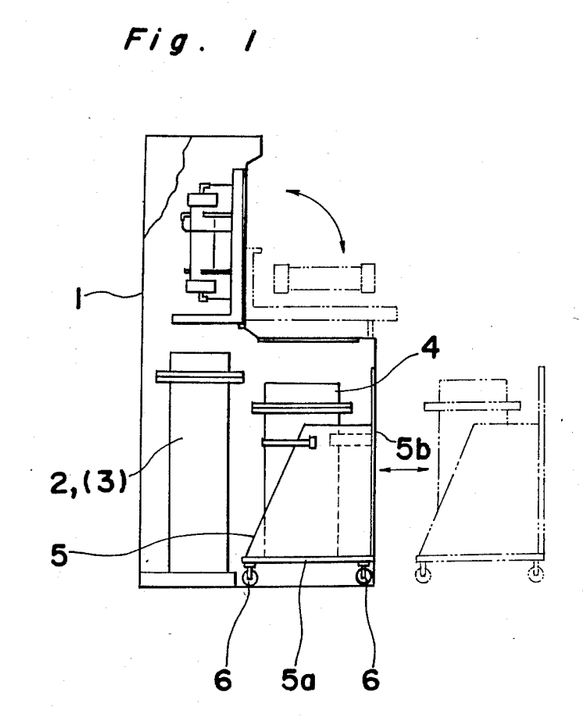
FIG. 1 is a front elevational view of an apparatus for supplying filtered liquid according to the present invention.
Figure 2:
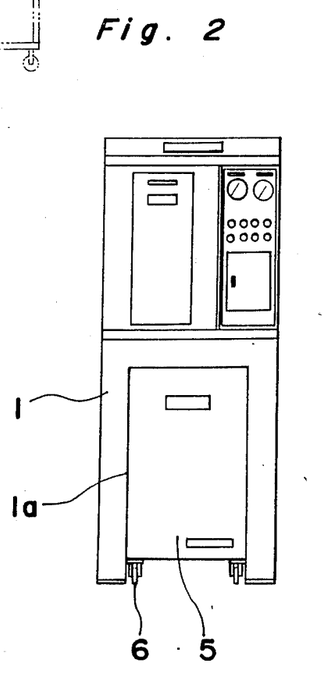
FIG. 2 is a side elevational view of the apparatus of FIG. 1.

Referring to FIG. 1 showing a front elevational view of an apparatus for supplying filtered liquid of the present invention, a main housing 1 of the apparatus is fixed at a suitable place in a factory, with a first fixed tank 2 and a second fixed tank 3 being provided in parallel relation to each other at the lower side portion within the main housing 1, and also a movable container 4 being accommodated in the main housing 1 by the side of the first and second fixed tanks 2 and 3 in such manner that it is able to be taken in and out of the main housing 1 through an opening 1a. The movable container 4 is securely placed on a caster 5 having a base plate 5a provided with rollers 6 so that the movable container 4 can be moved by pressing a plate 5b standing in front of the base plate 5a to be accommodated in the main housing 1 of the apparatus as it is placed on the caster 5.

Figure 3:
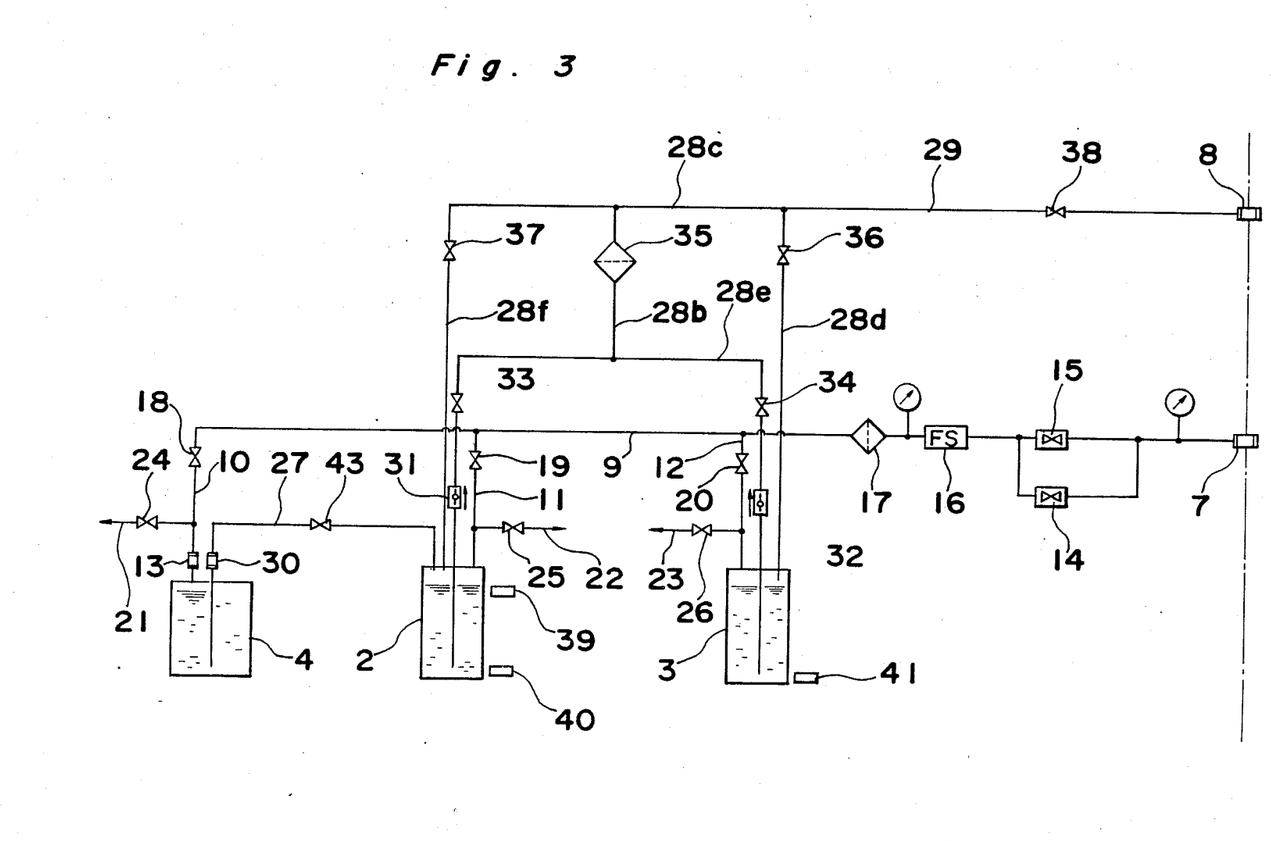
FIG. 3 is a diagram showing the assignment of pipes of the apparatus.

Referring now to FIG. 3, there are formed in the main housing 1 an air supply port 7 and a liquid discharge port 8, and a main air passage 9 connected to the air supply port 7 has a first air pipe 10, a second air pipe 11 and a third air pipe 12 diverged therefrom, which air pipes are respectively communicated with the movable container 4, the first fixed tank 2 and the second fixed tank 3, while the first air pipe 10 is detachably connected to the movable container 4 through a coupler 13. The above main air passage 9 is provided with, in the order from the side of the air supply port 7, a safety valve 14 for the movable container 4 and a safety valve 15 for fixed tanks in parallel relation to each other, a flux valve 16 of over-load interception type and an air filter member 17, both at the lower flow of the above safety valves 14 and 15. The first, second and third air pipes 10, 11 and 12 have respective switching valves 18, 19 and 20 inserted therein for addition of pressure, and at the same time, they are connected at the lower flow thereof to respective discharge pipes 21, 22 and 23 provided with switching valves 24, 25 and 26 respectively for discharge of air.

A first, a second and a third liquid passages 27, 28 and 29 are provided respectively between the movable container 4 and the first fixed tank 2, between the first fixed tank 2 and the second fixed tank 3, and between the second fixed tank 3 and the liquid discharge port 6, and the first liquid passage 27 formed with a switching valve 43 for supply of liquid is detachably connected to the movable container 4 through a coupler 30. The second liquid passage 28 connecting the first fixed tank 2 with the second fixed tank 3 is, as shown in the drawing, comprised of a pair of liquid passages from 28a, 28b, 28c through 28d, and from 28e, 28b through 28f, and the liquid passage 28a having its one end extended near to the bottom in the first fixed tank 2 and the passage 28e having its one end extended near to the bottom in the second fixed tank 3 are connected at their respective other ends to one end of the passage 28b, while the passage 28c communicated to the third liquid passage 29 is connected to the other end of the passage 28b and also to one ends of the passages 28d and 28f, with the other ends of the passages 28d and 28f being respectively positioned at the upper end portions in the second and first fixed tanks 3 and 2. The passages 28a and 28e are formed with a pair of valves 31 and 32 for prevention of backflow, and a pair of switch valves 33 and 34 for circulation of the liquid, and the passage 28b has a liquid filter 35 inserted therein, and moreover the passages 28d and 28f are provided with circulation switching valves 36 and 37, respectively. In addition, the third liquid passage 29 is provided with a switching valve 38 for the liquid to be discharged therefrom.

Further, the above first fixed tank 2 is installed with detectors 39 and 40 which indicate the remaining amount of the liquid in the tank, and at the same time, the second fixed tank 3 is also provided with a detector 41 for indication of the remaining amount of the liquid therein.

Figure 4:
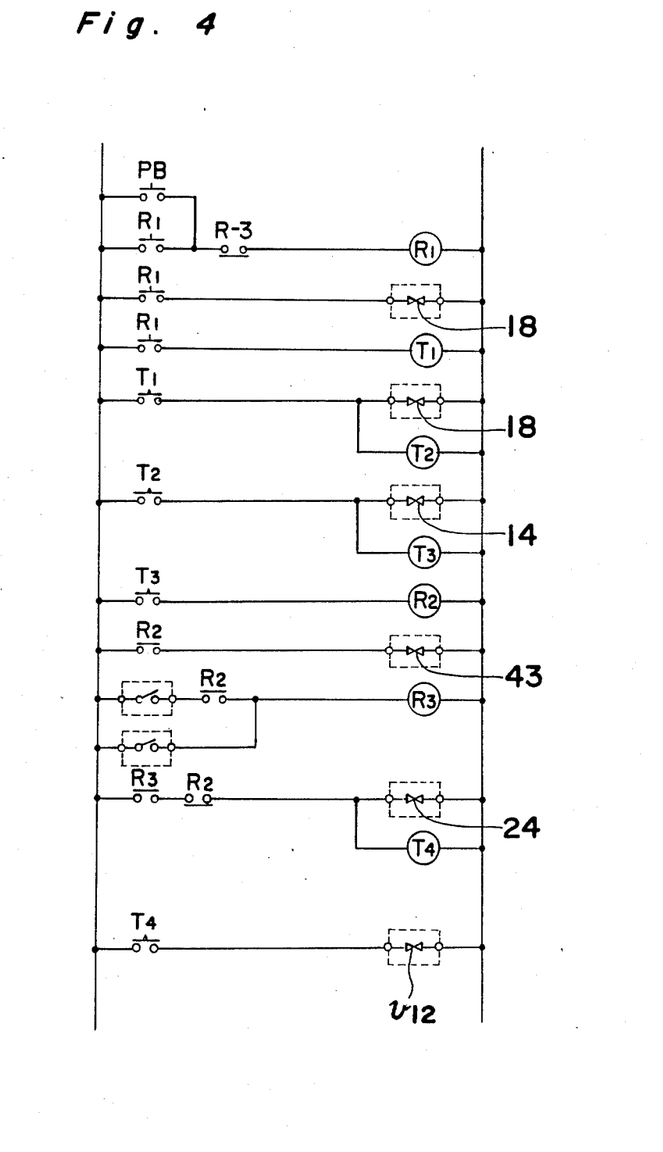
FIG. 4 is a diagram showing control circuit of a part of the apparatus.
Figure 5A:
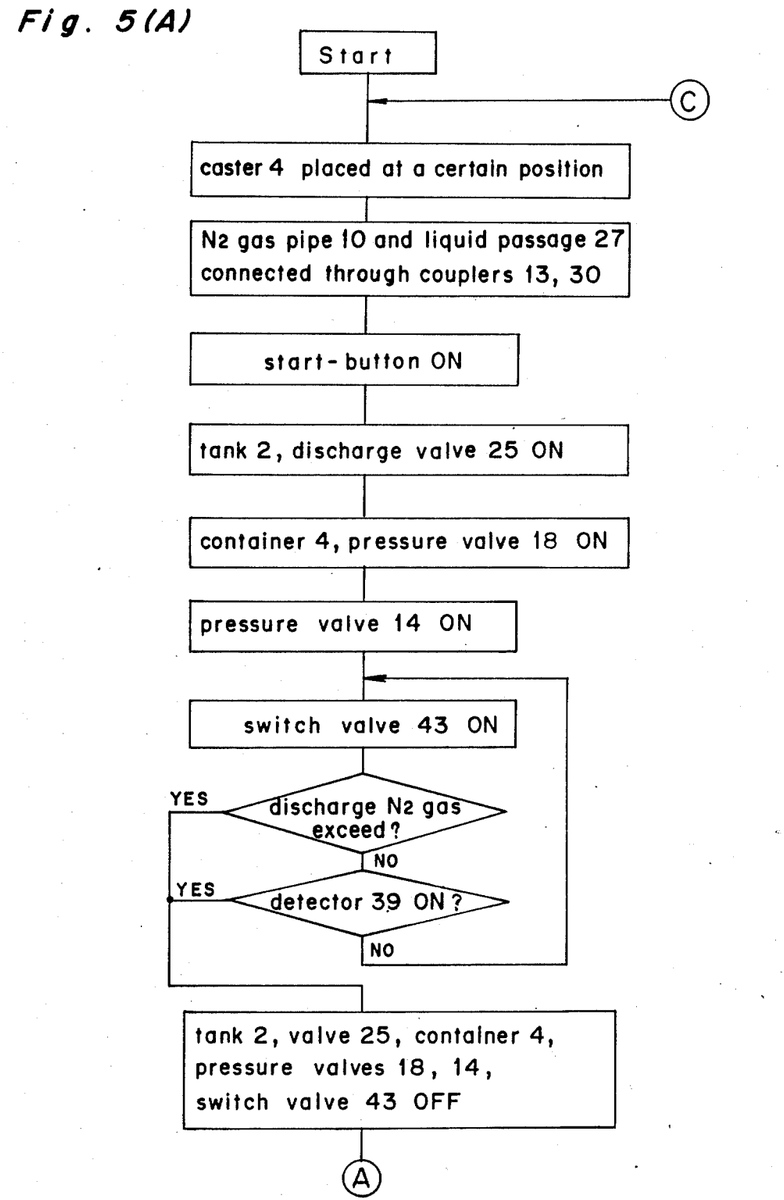
Figure 5B:
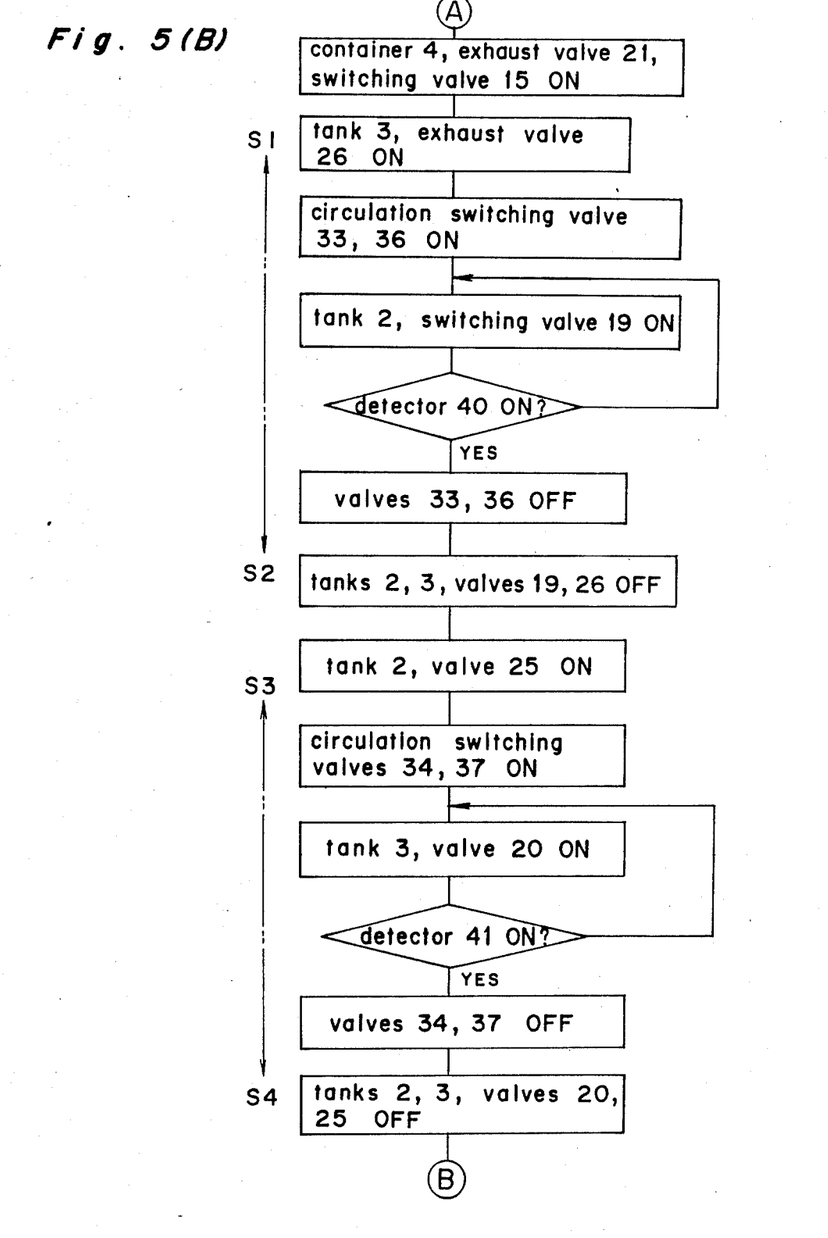
Figure 5C:
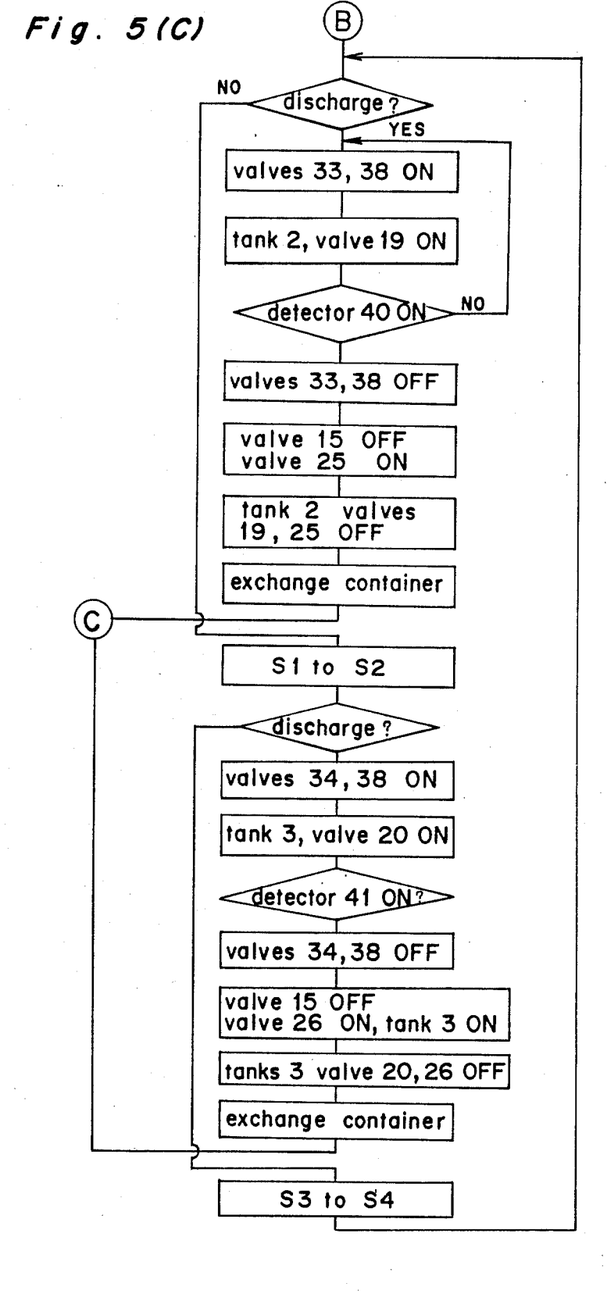

Each of the above-described switching valves 18, 19, 20, 24, 25, 26, 33, 34, 36, 37 and 38 is sequentially controlled by a control unit partially shown in FIG. 4 so as to accomplish operations in accordance with the flowchart of FIG. 5. In FIG. 4, reference R represents a relay, with a reference T representing a timer.

Hereinafter, the operation of the aforementioned apparatus will be described with reference to the flowsheet of FIG. 5.

First of all, the caster 5 loading thereon the movable container 4 filled with the liquid is placed at a predetermined position within the main housing, and the movable container 4 is connected with the first pipe 10 for supplying air (N2 gas) and the liquid passage 27 for supplying the liquid respectively through the couplers 13 and 30. Then, the control unit is turned on by a start-button. Subsequent to this, the first process (I) of FIG. 5 is started, in other words, the discharge valve 25 for the first fixed tank 2 is opened and then the pressure valves 18 and 14 are opened thereby to supply air to the movable container 4. Thereafter, the switch valve 43 for supplying liquid between the movable container 4 and the first fixed tank 2 is opened so as to transfer the liquid in the container 4 to the fixed tank 2 through the first pipe 27 by the action of the pressed air supplied from the first air pipe 10, with the discharge pipe 22 remained opened. When it is detected by the detector 39 that the liquid transferred from the container 4 to the tank 2 has reached to the upper limit, and accordingly the transfer of the liquid has been completed, the discharge switching valve 25 is closed, and concurrently with this, not only the switching valves 18 and 14 which supply air to the movable container 4 are closed, but the switching valve 43 for supplying the liquid from the container to the first tank 2 is closed. The completement of the transfer of the liquid from the movable container 4 to the fixed tank 2 as described above means the end of the first process.

Next, the second process (II) is started when the switching valve 24 is opened so as to discharge the gas within the movable container 4, while the switching valve 15 which applies pressure to the fixed tanks is opened. Then, the discharge switching valve 26 of the second fixed tank 3 is opened, and the circulation switching valves 33 and 36 of the second liquid passage 28 are opened. By opening the switching valve 19 for application of pressure to the first fixed tank 2, the liquid in the first fixed tank 2 is transferred by the action of the supplied air through the pipes 28a→28b→28c→28d to the second fixed tank 3, with the discharge pipe 23 being in an opened state. At this time, while the liquid is passed through the pipe 28b, the liquid is gone through the liquid filter 35 so that solid particles are removed from the liquid. When it is detected by the detector 40 that the liquid after being transferred to the second fixed tank 3 reaches to over the lower limit in the first fixed tank 2, the circulation switching valves 33 and 36 are closed, and then, the switching valve 19 for applying pressure to the fixed tank 2 is closed, and at the same time, the discharge switching valve 26 of the second fixed tank 3 is closed. Sequentially, the discharge switching valve 25 of the fixed tank 2 is opened, and simultaneously the circulation switching valves 34 and 37 formed in the pipes 28e and 38f of the second liquid passage 28 are opened, and then, the switching valve 20 is opened to apply pressure to the second fixed tank 3. Accordingly, the liquid within the second fixed tank 3 is transferred through the pipes 28e, 28b, 28c and 28f to the first fixed tank 2, by the action of the air pressure, during which time the liquid is filtered by running through the liquid filter 35 at the pipe 28b. When it is detected by the detector 41 that the liquid remained within the second fixed tank 3 after being transferred to the first fixed tank 2 has reached to the lower limit, the above circulation switching valves 34 and 37 are closed, and then, the switching valve 20 for applying pressure to the second fixed tank 3 is closed, with the discharge switching valve 25 for the first fixed tank 2 being closed. Thus, in the manner as described above, by repeating the transferring cycle of the liquid from the first fixed tank 2 through the filter 35 to the second fixed tank 3 as shown by one-dot line in the drawing, and then from the second fixed tank 3 through the filter 35 to the first fixed tank 2 as shown by two-dot line in the drawing, the liquid can be satisfactorily filtered. After the liquid has been fully filtered, the third process (III) is started to perform the discharge operation. At this time, in the case where the liquid transferred to the first tank 2 is to be discharged therefrom in the fully-filtered condition, the circulation valve 33 formed in the pipe 28a of the second liquid passage 28 and the output switching valve 39 of the third liquid passage 29 are opened, subsequent to which the switching valve 19 which supplies pressure to the first fixed tank 2 is opened. Thus, the liquid in the first fixed tank 2 is, through the pipes 28a, 28b and 28c of the second liquid passage 28, passed through the third liquid passage 29 to be discharged out of the liquid discharge port 8, during which time the liquid is filtered by the filter 35 in the pipe 28b. When the detector 40 detects that the liquid material within the firxt fixed tank 2 has reached to the lower limit, not only the above valves 33 and 38, but also the pressure valve 15 are closed, and at the same time, the discharge valve 25 is opened, thereafter completing the discharging operation with subsequent closure of the pressure valve 19 and the discharge valve 25. On the contrary, in the case where the liquid in the first fixed tank 2 has not experienced through satisfactory filtration, after the liquid is again returned through the filter 35 to the second fixed tank 3 in the process from S1 to S2 in FIG. 4, the switching valves 34 and 38 are opened so that the liquid is, through the filter 35, sent out from the second fixed tank 3 to the discharge port 8.

When it is necessary to transfer the liquid from the second fixed tank 3 to the first fixed tank 2, the liquid should be discharged after having been transferred to the first fixed tank 2 in the course from S3 to S4 in FIG. 5.

After the liquid is completely discharged from the above first fixed tank 2 or the second fixed tank 3, the movable container 4 is replaced with a new one.

In the case where the liquid should be continuously filtered and supplied, the movable container 4 is taken out of the housing, at the time when the liquid is completely transferred from the movable container 4 to the first fixed tank 2 so that the movable container 4 is filled with fresh liquid and returned into the main housing 1, and immediately after the completion of the above third process, the liquid is transferred from the movable container 4 to the first fixed tank 2, with the above first, second and third processes being performed by sequentially controlled.

Advantages of the Invention

As is described hereinabove, an apparatus for supplying filtered liquid according to the present invention is comprised of a movable container containing the liquid therein which is detachably accommodated within a main housing of a fixed type of the apparatus, a first tank of a first type to which the liquid in said movable container is transferred, and a second tank of a fixed type so that the liquid is repeatedly circulated between said first and second fixed tanks through a filter member, and accordingly the following advantages can be obtained by the present apparatus for supplying filtered liquid.

(a) Since each of the air passages is provided with a discharge valve, and at the same time each of the liquid passages is provided with a switching valve, the liquid in the movable container is, once after being transferred to the first fixed tank, repeatedly circulated between the first and second tanks while it is always passed through the filter member at each time of the circulation, and accordingly a liquid of high purity can be realized through satisfactory filtration.

(b) Solely with provision of just one filter member, the liquid material can be filtered may times, thereby rendering the apparatus simple in construction and low in manufacturing price.

(c) The liquid is able to be discharged either from the first fixed tank or the second fixed tank, and moreover it can be discharged immediately after a proper filtration.

(d) The movable container can be separated from the main housing of the apparatus even in the process of the filtering operation of the liquid conducted between the first and second fixed tanks once after the liquid in the movable container has been transferred to the first fixed tank, such that a fresh liquid is filled into the separated movable container at a desired place, and moreover, the movable container can be easily moved to the desired place since it is placed on the caster provided with rollers.

(e) Since the movable container can be exchanged with a fresh one during the filtering operation as mentioned earlier, the liquid in the movable container can be transferred to the first fixed tank immediately after the filtered liquid is discharged from the first and second fixed tanks, thereby enabling continuous filtering operation.

(f) Since there are provided valves in the liquid passage between the first and second fixed tanks for preventing the flow of the liquid from running backward, even though the switching valves 33 and 34 are opened simultaneously, the liquid is never moved directly from the fixed tank at the high-pressure side (pressure-applied side) to the fixed tank at the low pressure side (open-to-air side), but the liquid is always passed through the filter member.

What is claimed is:

1. An apparatus for continuously filtering liquid and supplying filtered liquid, comprising:
   means for continuously filtering and for supplying filtered liquid including;
   means for enabling liquid to be filtered, to be first transferred from a movable container to first tank and then to be repeatedly passed through the filtering means to a second tank and back again, sufficient to enable the movable container to be refilled while the liquid is filtered, said means of continuously filtering, further inlcluding, a housing;

the first tank and a second tank which are fixedly placed within the housing;

the movable container which can be removably placed within the housing;

a discharge port located within said housing;

a means for selectively supplying compressed gas to said first tank, said second tank, and said movable container;

a first liquid passage between the movable container and the first tank;

a second liquid passage between the first tank and the second tank;

the filtering means provided within said second liquid passage; and a third liquid passage between the discharge port and the second liquid passage.

2. An apparatus as claimed in claim 1, wherein said movable container is detachably connected to said means for selectively supplying compressed air and said first liquid passage by releaseable couplers.

3. An apparatus as claimed in claim 1, wherein said movable container is placed on rollers to facilitate moving said movable container in and out of said housing.

4. An apparatus as claimed in claim 1, further comprising switching valves within said first, second and third passages.

5. An apparatus as claimed in claim 1, wherein the compressed gas is nitrogen gas.

6. A device to continuously filter liquid and supply filtered liquid, comprising:

a movable container for supplying liquid to be filtered;

means for enabling continuous filtering of liquid including;

means for removing the liquid to be filtered from the movable container for sufficiently filtering the liquid, and for supplying the liquid to a discharge port, while enabling the movable container to be removed and to be refilled while the liquid is being filtered.

7. A device as claimed in claim 6 further comprising a housing and wherein the movable container is placed on rollers to facilitate moving said movable container in and out of said housing.

8. A device as claimed in claim 7 comprising a firt tank and a second tank fixedly placed with the housing.

9. A device as claimed in claim 8, wherein the liquid to be filtered is first transferred from the movable tank to the first tank and then is filtered by being repeatedly passed through a filtering means to the second tank and back again, thereby allowing the movable container to be removed and refilled while the liquid is being filtered.

* * * * *